US007971257B2

(12) United States Patent
Repasi et al.

(10) Patent No.: US 7,971,257 B2
(45) Date of Patent: Jun. 28, 2011

(54) OBTAINING NETWORK ORIGINS OF POTENTIAL SOFTWARE THREATS

(75) Inventors: Rolf Repasi, Sunrise Beach (AU); Ian Oliver, New South Wales (AU); Ryan Pereira, New South Wales (AU); Neil Younusov, Sydney (AU)

(73) Assignee: Symantec Corporation, Mountain View, CA (US)

( * ) Notice: Subject to any disclaimer, the term of this patent is extended or adjusted under 35 U.S.C. 154(b) by 831 days.

(21) Appl. No.: 11/830,144

(22) Filed: Jul. 30, 2007

(65) Prior Publication Data

US 2008/0034434 A1   Feb. 7, 2008

Related U.S. Application Data

(60) Provisional application No. 60/835,210, filed on Aug. 3, 2006.

(51) Int. Cl.
| G06F 11/00 | (2006.01) |
| G06F 12/14 | (2006.01) |
| G06F 12/16 | (2006.01) |
| G06F 11/30 | (2006.01) |
| G06F 9/44 | (2006.01) |
| G06F 9/445 | (2006.01) |
| G08B 23/00 | (2006.01) |
| G06F 15/16 | (2006.01) |

(52) U.S. Cl. ............ 726/24; 726/25; 713/188; 717/169; 717/173; 717/175; 717/178

(58) Field of Classification Search .............. 726/22–25; 709/245; 713/188
See application file for complete search history.

(56) References Cited

U.S. PATENT DOCUMENTS

| 5,050,212 | A  * | 9/1991  | Dyson .......................... 713/187 |
| 5,511,163 | A  * | 4/1996  | Lerche et al. ................... 714/28 |
| 5,948,104 | A  * | 9/1999  | Gluck et al. .................... 726/24 |
| 5,958,051 | A  * | 9/1999  | Renaud et al. .................. 726/22 |
| 6,347,398 | B1 * | 2/2002  | Parthasarathy et al. ........ 717/178 |
| 6,516,337 | B1 * | 2/2003  | Tripp et al. .................... 709/202 |
| 6,633,864 | B1 * | 10/2003 | Christensen et al. ................ 1/1 |
| 6,721,721 | B1 * | 4/2004  | Bates et al. ......................... 1/1 |
| 6,785,732 | B1 * | 8/2004  | Bates et al. ................... 709/232 |
| 6,892,303 | B2 * | 5/2005  | Le Pennec et al. ........... 713/188 |
| 6,952,776 | B1 * | 10/2005 | Chess ........................... 713/188 |
| 6,973,578 | B1 * | 12/2005 | McIchionc ...................... 726/24 |
| 7,089,589 | B2 * | 8/2006  | Chefalas et al. ................ 726/22 |

(Continued)

FOREIGN PATENT DOCUMENTS

JP        11110211 A  *  4/1999

*Primary Examiner* — Christopher A Revak
*Assistant Examiner* — Carolyn B Kosowski
(74) *Attorney, Agent, or Firm* — Holland & Hart LLP

(57) ABSTRACT

A method/system/computer program for obtaining the network origin of a downloaded entity of interest (e.g. a threat or malicious software). The method includes recording the network locations of at least some files downloaded to a processing system and recording the physical locations of the at least some files stored in one or more storage devices of the processing system. Then, identifying an entity of interest in the processing system and searching the recorded network locations and the recorded physical locations for the network location and the physical location of the entity of interest. Then, if the network location and the physical location of the entity of interest is identified, transmitting the network location and the physical location of the entity of interest to a remote processing system.

20 Claims, 4 Drawing Sheets

U.S. PATENT DOCUMENTS

| | | | |
|---|---|---|---|
| 7,096,215 B2 * | 8/2006 | Bates et al. | 1/1 |
| 7,117,367 B2 * | 10/2006 | Carro | 713/176 |
| 7,152,164 B1 * | 12/2006 | Loukas | 713/188 |
| 7,177,937 B2 * | 2/2007 | Bates et al. | 709/228 |
| 7,287,279 B2 * | 10/2007 | Bertman et al. | 726/23 |
| 7,418,732 B2 * | 8/2008 | Campbell et al. | 726/23 |
| 7,418,733 B2 * | 8/2008 | Connary et al. | 726/25 |
| 7,469,419 B2 * | 12/2008 | Sobel | 726/24 |
| 7,475,427 B2 * | 1/2009 | Palliyil et al. | 726/24 |
| 7,509,680 B1 * | 3/2009 | Sallam | 726/24 |
| 7,526,810 B2 * | 4/2009 | Lalonde et al. | 726/24 |
| 7,546,353 B2 * | 6/2009 | Hesselink et al. | 709/216 |
| 7,548,544 B2 * | 6/2009 | Quinlan et al. | 370/392 |
| 7,640,590 B1 * | 12/2009 | McCorkendale et al. | 726/25 |
| 7,752,669 B2 * | 7/2010 | Palliyil et al. | 726/24 |
| 2005/0015626 A1 * | 1/2005 | Chasin | 713/201 |
| 2005/0188272 A1 * | 8/2005 | Bodorin et al. | 714/38 |
| 2007/0006304 A1 * | 1/2007 | Kramer et al. | 726/22 |
| 2007/0016951 A1 * | 1/2007 | Piccard et al. | 726/24 |
| 2007/0016953 A1 * | 1/2007 | Morris et al. | 726/24 |
| 2007/0028110 A1 * | 2/2007 | Brennan | 713/176 |
| 2007/0028303 A1 * | 2/2007 | Brennan | 726/24 |
| 2007/0067842 A1 * | 3/2007 | Greene et al. | 726/24 |
| 2007/0156727 A1 * | 7/2007 | Lim | 707/100 |
| 2007/0156900 A1 * | 7/2007 | Chien | 709/225 |
| 2007/0157315 A1 * | 7/2007 | Moran | 726/23 |
| 2007/0174911 A1 * | 7/2007 | Kronenberg et al. | 726/22 |
| 2007/0226797 A1 * | 9/2007 | Thompson et al. | 726/22 |
| 2008/0225719 A1 * | 9/2008 | Korrapati et al. | 370/235 |

* cited by examiner

OBTAINING NETWORK ORIGINS OF POTENTIAL SOFTWARE THREATS

This application claims the benefit of priority from Provisional Application Ser. No. 60/835,210, filed on Aug. 3, 2006, which is hereby incorporated by reference in its entirety.

TECHNICAL FIELD

The present invention generally relates to the field of computing and malicious software or software threats, such as for example a computer virus or worm, and more particularly to a method, system, computer readable medium of instructions and/or computer program product for obtaining a network origin of potential or actual malicious software or software threats, and/or for obtaining the network location of a downloaded file.

BACKGROUND ART

As used herein a "threat" includes malicious software, also known as "malware" or "pestware", which includes software that is included or inserted in a part of a processing system for a harmful purpose. The term threat should be read to include possible, potential and actual threats. Types of malware can include, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

CROSS-REFERENCES

The present applicant has filed co-pending patent applications directed to systems/methods for identifying threats and related files. U.S. patent application Ser. No. 11/707,425 for "Determination of Related Entities", U.S. patent application Ser. No. 11/731,324 for "Determination of Malicious Entities", U.S. patent application Ser. No. 11/803,875 for "Method and System to Scan Firmware for Malware" and U.S. patent application Ser. No. 11/803,761 for "Method and System to Detect Malicious Software" provide examples of means to identify threats (i.e. malicious entities) and are each incorporated herein by reference.

There are currently a number of techniques which can be used to detect malware in a processing system. One technique includes using database driven malware techniques which detect known malware. In this technique, a database is used which generally includes a signature indicative of a particular type of malware. However, this technique suffers from a number of disadvantages. Generating and comparing signatures for each entity in a processing system to the database can be highly process-intensive task. Other applications can be substantially hampered or can even malfunction during this period of time when the detection process is performed. Furthermore, this technique can only detect known malware. If there is no signature in the database for a new type of malware, malicious activity could be performed without detection of the new type of malware.

Due to malware changing rapidly as new versions or modifications of malware infect processing systems, malware scanners and detectors need to be continually updated to determine which entities are related and considered malicious. The continual maintenance of a malware scanner can be a time-consuming task for users of processing systems as well as the manufacturers or vendors of the malware scanner (i.e. anti-malware software). Furthermore, most malware scanners only detect malware for which the scanner software has already been configured to detect. Therefore, when modified malware infects a processing system which is undetectable by the malware scanner, there is no easy process for the malware scanner, or a user of the processing system, to determine which related entities in the processing system are malicious.

It is desirable to promptly and constantly update a database associated with a malware scanner with information about the most prevalent threats, this can require analysts or malware researchers to constantly search for network addresses and paths for such threats.

Presently, the ability to obtain network address and path information for threats is limited and relatively difficult. Analysts or malware researchers may be able to obtain some links to malware installers from downloaded program files, however this method of obtaining malware installer URLs was only practical when active components were more widely used in malware, which currently is no longer the case.

A hook (also known as a hook procedure or hook function) generally refers to a function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process is at least one of a running software program or other computing operation, or a part of a running software program or other computing operation, that performs a task.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

A kernel refers to the core part of an operating system, responsible for resource allocation, low-level hardware interfaces, security, etc.

An interrupt is at least one of a signal to a processing system that stops the execution of a running program so that another action can be performed, or a circuit that conveys a signal stopping the execution of a running program.

A system registry is a database used by modern operating systems, for example Windows™ platforms. The system registry includes information needed to configure the operating system. The operating system refers to the registry for information ranging from user profiles, to which applications are installed on the machine, to what hardware is installed and which ports are registered.

A hash function (i.e. Message Digest, e.g. MD5) can be used for many purposes, for example to establish whether a file transmitted over a network has been tampered with or contains transmission errors. A hash function uses a mathematical rule which, when applied to a file, generates a hash value, i.e. a number, usually between 128 and 512 bits in length. This number is then transmitted with the file to a recipient who can reapply the mathematical rule to the file and compare the resulting number with the original number.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (i.e. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

There is a need for a method, system, computer program product and/or computer readable medium of instructions which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

According to a first broad form, there is provided a method of obtaining the network origin of a downloaded entity of interest, the method including the steps of: recording the network locations of at least some files downloaded to the processing system; recording the physical locations of the at least some files; identifying an entity of interest; searching the recorded network locations and the recorded physical locations for the network location and the physical location of the entity of interest; and, if the network location and the physical location of the entity of interest is identified, transmitting the network location and the physical location of the entity of interest to a remote processing system.

In a particular, but non-limiting, form, identifying information of an entity responsible for downloading a file to the processing system is also recorded.

In a particular, but non-limiting, form at least some of the events performed in the processing system by the at least some files downloaded to the processing system are also recorded.

In a particular, but non-limiting, form the recorded network locations and the recorded physical locations are searched for the network location and the physical location of any files downloaded by the entity of interest.

In a particular, but non-limiting, form the recorded network locations and the recorded physical locations are searched for the network location and the physical location of a file which downloaded the entity of interest.

In a particular, but non-limiting, form the recorded network locations and the recorded physical locations are searched for the network location and the physical location of a file which created the entity of interest.

In accordance with specific optional embodiments, provided by way of example only: the network location is a Uniform Resource Locator (URL); the network locations of all files downloaded to the processing system are recorded; the network locations of files of at least one type downloaded to the processing system are recorded; and/or the type of file is one or more of the group: executable; archive; library; and data.

Preferably, though not necessarily, the entity of interest is a threat. Also, the entity of interest may be identified by being a related entity to a threat.

Optionally, but not necessarily, the hash function of at least some files downloaded to the processing system are also recorded, and the hash function of the entity of interest is also transmitted to the remote processing system.

Optionally, but not necessarily, an automatically generated sliding fit signature for the entity of interest is also transmitted to the remote processing system.

Optionally, but not necessarily, the network locations of related entities of interest are recorded as a related group of network locations.

Preferably, though not necessarily, the remote processing system is a server.

Thus, an embodiment allows tracking of URLs of threats and respective volumes, and also allows retrieval of the same files as downloaded on a user processing system by an anti-malware vendor for analysis by an analyst or researcher, without requiring the user to send all the threat associated files. These threat URLs can then be grouped together as related threat information.

An embodiment also allows identification of blocks of IP addresses which are being used by organisations or individuals that deploy malware, such as companies that distribute spyware or adware. This can be useful for analysis of malware and also for creating "bad sites" lists. Analysis of these IP address ranges may also assist in discovery of more malware infection vectors. This enables harvesting of URLs for downloaded suspicious or malicious entities (i.e. threats).

An embodiment can store URLs for at least some or all entities of a certain type or types, such as executable entities (e.g. programs) and archives. A URL and/or IP address for an entity responsible for downloading another suspect entity can also be recorded, as well as the physical location on the disk of any downloaded files.

Furthermore, if an entity, such as file in a processing system, is discovered to be suspect or a threat it would be desirable to know how the entity arrived in the processing system. A network address, from which the entity was downloaded, may also be considered to be a source of malware infections and could be blocked or reported to a server for assessment by a malware researcher or analyst.

According to a further broad form, there is provided a method of obtaining the network location of a downloaded file, the method including the steps of: identifying when an entity is being downloaded; storing the network location of the entity in a record, and storing one or more of a hash function for the entity, a size of the entity, a series of sections of the entity, and a filename for the entity; identifying when a new file is created; comparing information in the record with one or more of a hash function for the new file, a size of the new file, a series of sections of the new file, and a filename for the new file; and, storing at least the network location and the filename for the new file in a second record.

In accordance with specific optional embodiments, provided by way of example only: the entity is an executable file; the entity is an archive containing an executable file; the entity is in the process of downloading or has downloaded; a network driver is used to intercept all network activity associated with the processing system; the new file creation is identified using event hooking; and/or the event hooking includes one or more of: API hooking; kernel mode driver; system callbacks; and polling all files.

According to further broad forms, there is provided a system and a computer program product.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
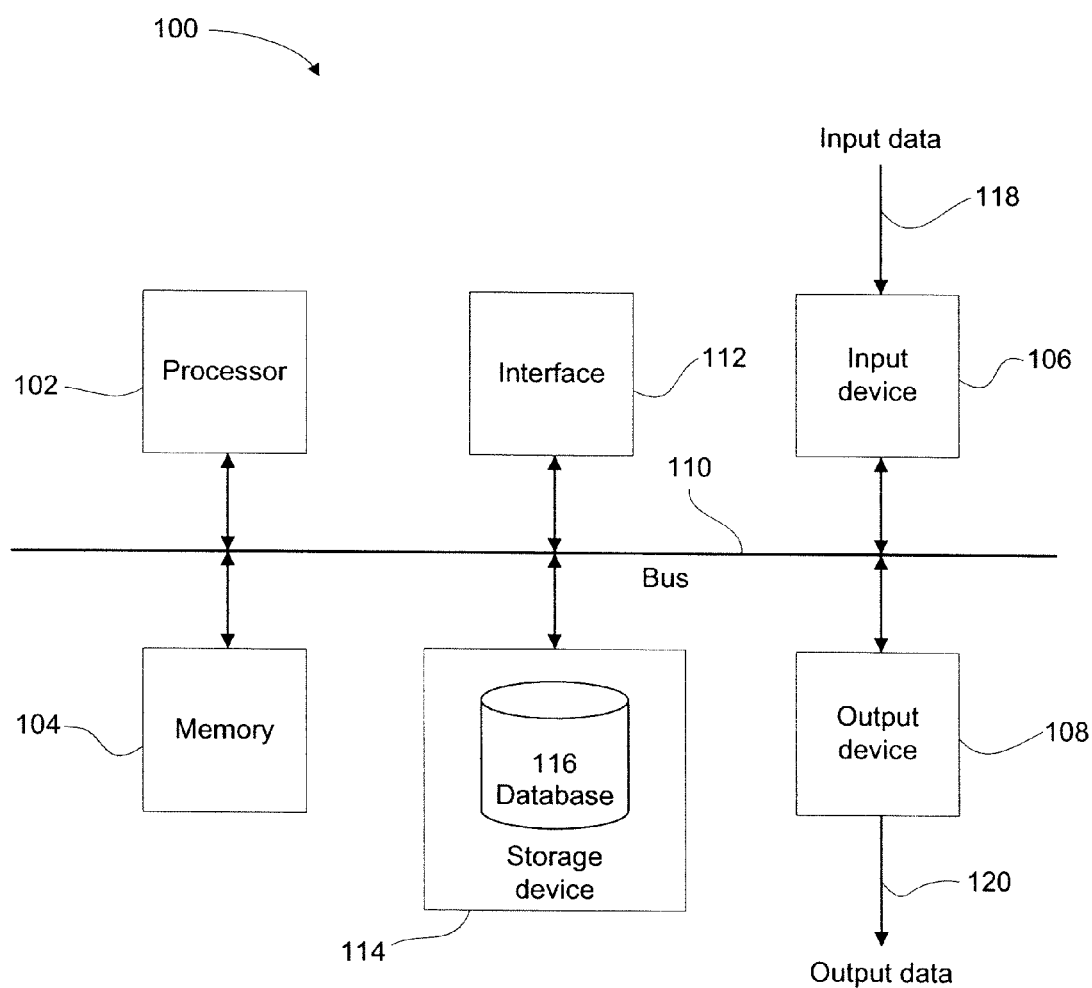
FIG. 1 illustrates a functional block diagram of an example processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Processing System

A particular embodiment of the present invention can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In a particular embodiment, input data 118 can be a downloaded file or entity and output data 120 can be the identified network location and the physical location of an entity of interest transmitted to a remote processing system.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to a network, for example the Internet or a WAN. Input data 118 and output data 120 could be received from or communicated to other devices, such as a server, via the network. The network may form part of, or be connected to, the Internet, and may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Obtaining the Network Origin of a Downloaded Entity of Interest

Figure 2:
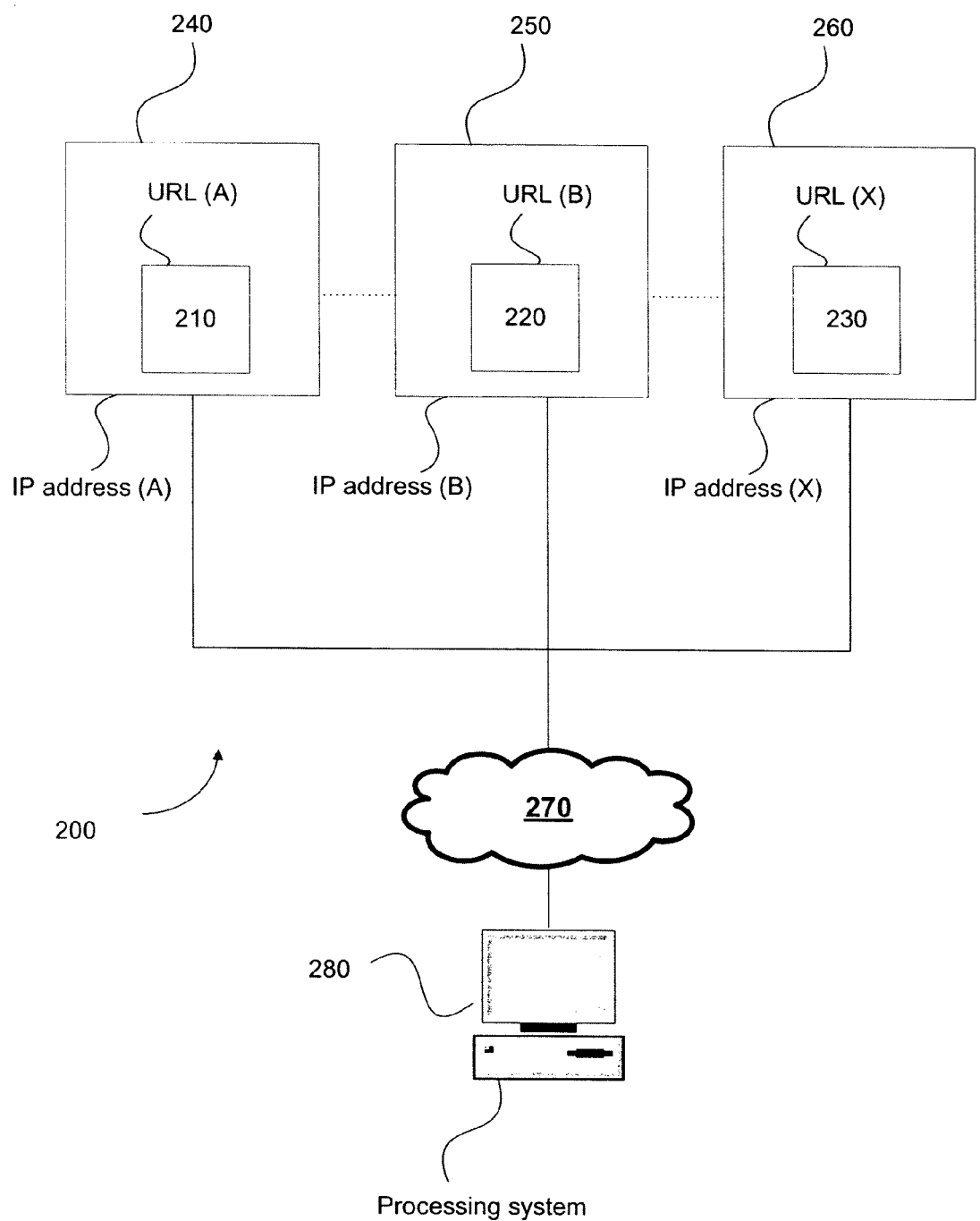
FIG. 2 illustrates an example overview system.

Referring to FIG. 2, there is illustrated an overview of system 200. Files 210, 220 and 230 reside in processing systems 240, 250 and 260 respectively. Files 210, 220 and 230 are downloaded via network 270 to processing system 280. Files 210, 220 and 230 could each be an entity of interest, such as a threat. Alternatively, files 210, 220 or 230 could be harmless files. Each file 210, 220 and 230 has a Uniform Resource Locator (URL) illustrated as URL(A), URL(B) and URL(X) respectively. Processing systems 240, 250 and 260 are also allocated an IP address(A), IP address(B) and IP address(X) respectively. Obviously, one or more files could be downloaded from a single processing system, however each file from a single processing system would have a different URL. Three files are discussed by way of example and for illustration only, any other number of files can apply.

Figure 3:
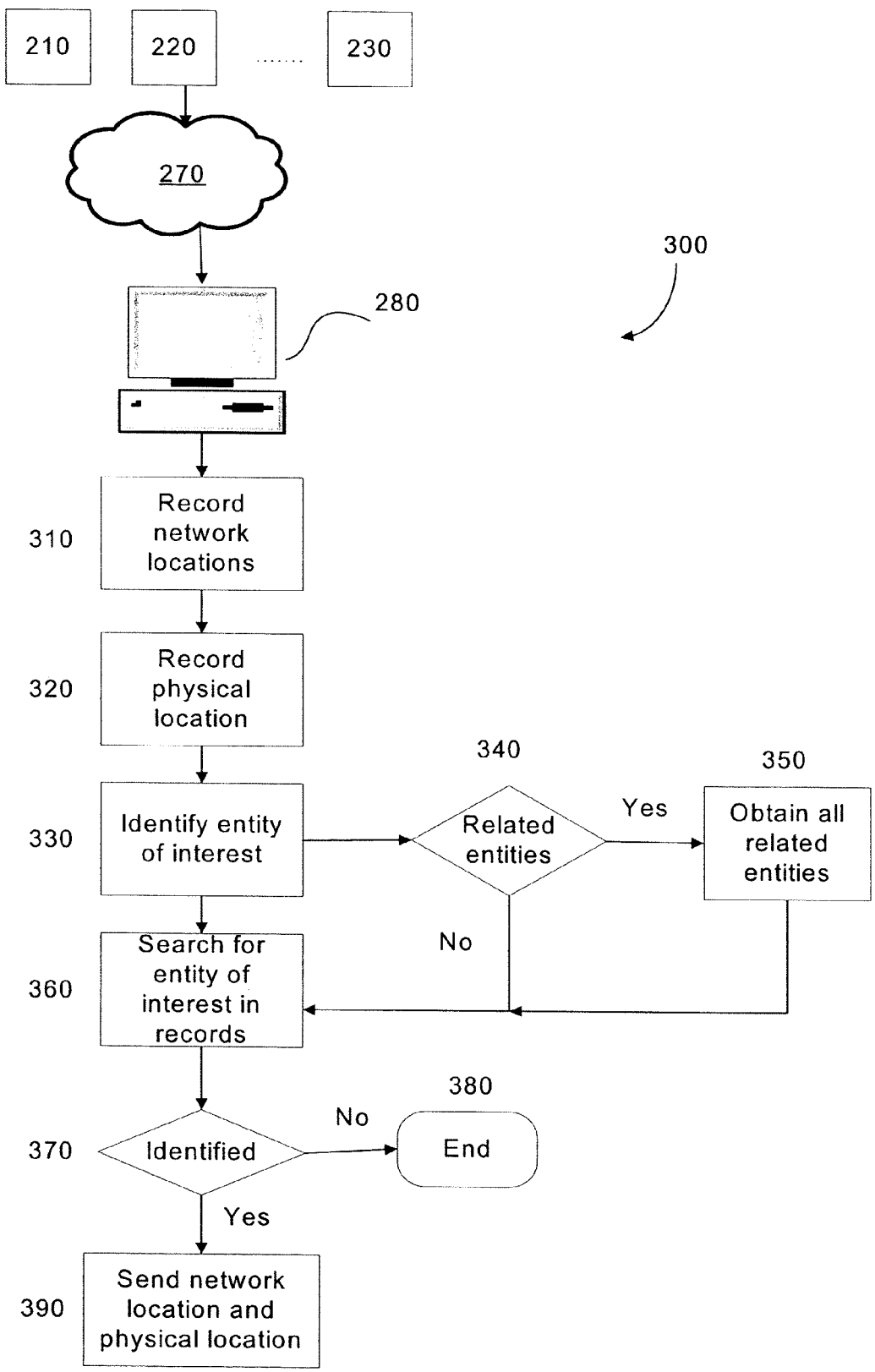
FIG. 3 illustrates a flow diagram of an example method of obtaining the network origin of a downloaded entity of interest.

Referring to FIG. 3, there is illustrated a method 300 of obtaining the network origin of a downloaded entity of interest, such as a threat. One or more files, such as files 210, 220 and 230 are downloaded to processing system 280 via network 270. Method 300 includes at step 310 recording the network locations of at least some files 210, 220 and 230 downloaded to processing system 280. At step 320, the physical location of the at least some files 210, 220 and 230 in a storage device of processing system 280, for example storage device 114 of processing system 100, is also recorded.

At step 330, an entity of interest is identified in processing system 280. Identification of an entity of interest can be achieved by a variety of methods or techniques. There are a variety of known methods for identifying an entity of interest, which may be a threat, such as malicious software. As a non-limiting example, various methods are disclosed in U.S. patent application Ser. Nos. 60/783,242, 60/788,853, 60/808, 916 and 60/808,917 and each of these applications is incorporated herein by reference. It will be appreciated that any known method of identifying malware could be utilised at step 330.

At step 340 checks are made to see if there are any related entities to the identified entity of interest. Again, there are a variety of known techniques for identifying related entities and which can include checking an event log stored in a database. For example, methods for determining related entities are disclosed in the aforementioned US patent applications.

At step 350, if related entities are identified at step 340, then the entity of interest and each related entity can be subjected to next step 360 in turn. Step 360, involves searching the recorded network locations and the recorded physical locations for a specific network location and physical location of the entity of interest (or each related entity). At step 370, if a recorded physical location and network location are not identified method 300 can end at step 380, otherwise if relevant records are identified, then at step 390 the identified network location and physical location for the entity of interest (or related entity) is transmitted to a remote processing system, for example a server.

It may also be desirable to record identifying information, such as file name and location, of an entity (e.g. a file) that is responsible for downloading a file to processing system 280. In this way if the file ends up being identified as an entity of interest, there exists identifying information of the entity responsible for downloading the file.

It may also be desirable to record at least some of the events performed in processing system 280 by at least some of the files downloaded to processing system 280. This can provide a useful record of files that may have initiated further downloads or be related to other files. This may also show the creation of executable files by other executable files. This can be beneficial as file behaviours can be monitored for triggers and also to ensure that a complete trail of events for the creation of all entities/files can be reconstructed.

By knowing event history the recorded network locations and the recorded physical locations can also be searched for any files that may have been downloaded by an identified entity of interest. Furthermore, the recorded network locations and physical locations can be searched for any file which may have downloaded or created the identified entity of interest.

Preferably, the network location is a Uniform Resource Locator (URL). It should be noted that some requests for files can include additional information as well as a URL and any such additional information can be recorded with the URL as the network location. Also preferably, recording of network locations and physical locations in the processing system are recorded continuously. It is also possible to record the network locations and/or physical locations of all files downloaded to the processing system. Alternatively, network locations and/or physical locations of only certain types of files downloaded to the processing system may be recorded. Types of files may include executable, archive, library and/or data files. When an entity of interest is identified the entity of interest may be, but need not, be a threat.

It is also possible to record the hash value (i.e. Message Digest, eg. MD5) for some or all files downloaded to the processing system. This allows the hash value to be optionally provided to the remote processing system for an entity of interest. Furthermore, it is possible to automatically generate a sliding fit signature for an entity of interest which can also be transmitted to the remote processing system.

When several network locations of related entities of interest are recorded or transmitted, the network locations can be recorded or stored as a related group of network locations. It is also possible to store relationship information between any related network locations.

Thus, network locations can be received at the remote processing system relatively quickly. This allows the remote processing system to automatically, or for researchers or analysts to manually, download the entity of interest before the network location is no longer valid. A record of all bad network locations found can also be kept to warn users who may visit the network locations in the future. This means that any entities of interest, which may be threats, can be obtained from the original network location rather than from a user's processing system.

Method 300 can be performed whenever a threat is detected by a user's existing malware scanner. This can assist in keeping malware databases and malware network locations up to date. Identifying an entity of interest may occur either by triggering from a behaviour-based analysis or other form of malware detection. Thus, potentially by identifying only one component of a threat the complete threat, that is all related files, could be identified by obtaining all installation download URL's without requiring the complete threat to be downloaded from a user's computer to a server.

All URL's for downloaded entities of interest, such as archives and executables, can be reported to a server and server-trending can be performed to identify the URL's of other downloaded files that may potentially correspond to malicious entities.

When a user visits a web-site related to a URL of an entity of interest, or if the web-site contains a link to a URL for an entity of interest, the user can be warned about potential threats at the web-site. For example, the warning could be relayed to the user via the user's web browser.

Obtaining the Network Location of a Downloaded File

Figure 4:
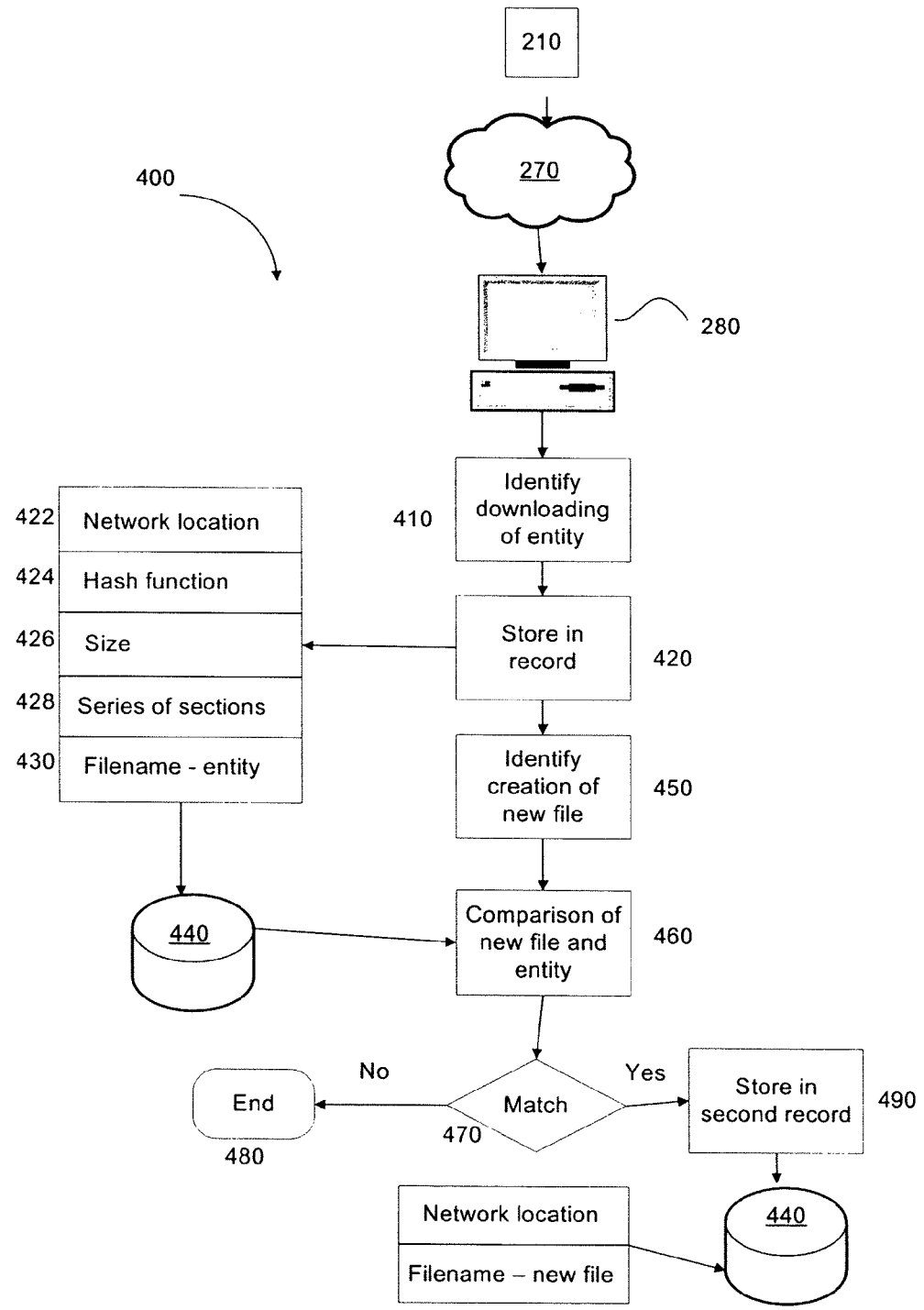
FIG. 4 illustrates a flow diagram of an example method of obtaining the network location of a downloaded file.

In some cases the connection between a downloaded entity and the originating network location may not be trivial to establish. Referring to FIG. 4, there is illustrated a method 400 for obtaining the network location of a downloaded file 210 when file 210 is downloaded to processing system 280 via network 270. Method 400 involves at step 410 identifying when an entity is downloading to processing system 280. At step 420, the network location 422 of the entity is stored in a record. Additionally, the hash function 424, size 426, series of sections 428 and/or file name 430 for the entity are stored in the record in database or list 440. At step 450, it is identified when a new file is created in processing system 280. At step 460, there is a comparison of information in the record or list from database or store 440 with one or more of a hash function for the new file, a size of the new file, a series of sections of the new file and/or a file name for the new file. This provides a means of comparing the new file and downloaded entities.

At step 470, if a match is not found in the comparison at step 460 between the new file and the entity, method 400 can end at step 480. However, if a match is found between the new file and the entity, at step 490 network location 422 and the file name for the new file 492 is stored in a second record or list in the database or store 440.

In a particular form, all downloading entities can be monitored or only certain types of downloading entities can be monitored. For example, all executable files or archives containing an executable file may be monitored as downloading entities. Method 400 may initiate when the entity is in the process of downloading or has downloaded.

A network driver can be used to intercept all network activity involving processing system 280 to provide monitoring of downloading entities.

The creation of the new file can be identified by making use of event hooking. Techniques that can be utilised include API hooking, kernel mode driver, system callbacks or polling all file creations. Each time a new file is created it can be checked against one or more of the downloaded entities by making a comparison of the respective hash functions (i.e. MD5), file sizes, series of sections, and/or file names.

Information in the second record thus contains the desired information of a list of file names with respective network locations of the originating network source. The network location provides the full pathway and not just a base address.

Preferably, though not necessarily, as the time between the downloaded files and the creation of a file disk is unlikely to be more than 24 hours, entities in the record which are more than, for example, 24 hours old could be removed.

Thus, there has been provided means for obtaining a network origin of potential or actual malicious software or software threats, and means for obtaining the network location of a downloaded file.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, firmware, or an embodiment combining software and hardware aspects.

The invention claimed is:

1. A method of obtaining a network origin of a downloaded entity of interest, the method including the steps of, in a processing system:
   recording network locations of at least some files downloaded to the processing system;
   recording physical locations of the at least some files stored in one or more storage devices of the processing system;
   recording at least some events performed in the processing system by the at least some files downloaded to the processing system;
   identifying an entity of interest in the processing system;
   searching the recorded network locations and the recorded physical locations for a network location and a physical location of the entity of interest;
   using the at least some recorded events to search the recorded network locations and the recorded physical locations for a network location and a physical location for a file downloaded to the processing system by the identified entity of interest; and
   if the network location and the physical location of the entity of interest are identified, transmitting the network location and the physical location of the entity of interest and the network location and the physical location of the file downloaded to the processing system by the entity of interest to a remote processing system, wherein the remote processing system downloads the entity of interest and the file downloaded to the processing system directly from the transmitted network locations.

2. The method as claimed in claim 1, further including the step of searching the recorded network locations and the recorded physical locations for the network location and the physical location of any files downloaded by the processing system.

3. The method as claimed in claim 1, further including the step of searching the recorded network locations and the recorded physical locations for the network location and the physical location of a file which downloaded or created the entity of interest.

4. The method as claimed in claim 1, wherein a network location is a Uniform Resource Locator (URL).

5. The method as claimed in claim 1, wherein the network locations of all files downloaded to the processing system are recorded.

6. The method as claimed in claim 1, wherein the network locations of files of at least one type downloaded to the processing system are recorded.

7. The method as claimed in claim 6, wherein a type of file is from the group of an executable, an archive, a library, and data.

8. The method as claimed in claim 1, further including recording a hash function of at least some files downloaded to the processing system, and transmitting a hash function of the entity of interest to the remote processing system.

9. The method as claimed in claim 1, wherein an automatically generated sliding fit signature for the entity of interest is also transmitted to the remote processing system.

10. The method as claimed in claim 1, further including obtaining the network location of an entity of interest by:
   identifying when an entity is being downloaded to the processing system;
   storing the network location of the entity in a record, and storing one or more of a hash function for the entity, a size of the entity, a series of sections of the entity, and a filename for the entity;
   identifying when a new file is created in the processing system;
   comparing information in the record with one or more of a hash function for the new file, a size of the new file, a series of sections of the new file, and a filename for the new file; and,
   if a match is found between the new file and the entity, storing at least the network location and the filename for the new file in a second record.

11. A non-transitory computer program product for obtaining a network origin of a downloaded entity of interest, the computer program product executable in a processing system and configured to:

record network locations of at least some files downloaded to the processing system;

record physical locations of the at least some files stored in one or more storage devices of the processing system;

record at least some events performed in the processing system by the at least some files downloaded to the processing system;

identify an entity of interest in the processing system;

search the recorded network locations and the recorded physical locations for a network location and a physical location of the entity of interest;

use the at least some recorded events to search the recorded network locations and the recorded physical locations for a network location and a physical location for a file downloaded to the processing system by the identified entity of interest; and if the network location and the physical location of the entity of interest are identified, transmit the network location and the physical location of the entity of interest and the network location and the physical location of the file downloaded to the processing system by the entity of interest to a remote processing system, wherein the remote processing system downloads the entity of interest and the file downloaded to the processing system directly from the transmitted network locations.

12. A method of obtaining a network location of a downloaded file, the method including the steps of, in a processing system:

identifying when an entity is being downloaded to the processing system;

storing a network location of the entity in a record, and storing one or more of a hash function for the entity, a size of the entity, a series of sections of the entity, and a filename for the entity;

identifying when a new file is created in the processing system;

comparing information in the record with one or more of a hash function for the new file, a size of the new file, a series of sections of the new file, and a filename for the new file;

if a match is found between the new file and the entity, storing at least the network location and the filename for the new file in a second record;

recording at least some events performed in the processing system by the new file created in the processing system;

using the at least some recorded events to search the stored network locations for a network location for a file downloaded to the processing system by the new file; and transmitting the network location of the new file and the network location of the file downloaded to the processing system by the new file to a remote processing system, wherein the remote processing system downloads the new file and the file downloaded to the processing system directly from the transmitted network locations.

13. The method as claimed in claim 12, wherein the entity is an executable file or an archive containing an executable file.

14. The method as claimed in claim 12, wherein the method is performed when the entity is in the process of downloading or has downloaded.

15. The method as claimed in claim 12, wherein a network driver is used to intercept all network activity associated with the processing system.

16. The method as claimed in claim 12, wherein the new file creation is identified using event hooking.

17. The method as claimed in claim 16, wherein the event hooking includes one or more of API hooking, kernel mode driver, system callbacks, and polling all files.

18. The method as claimed in claim 12, wherein the record is periodically deleted.

19. A non-transitory computer program product for obtaining a network location of a downloaded file, the computer program product executable in a processing system and configured to:

identify when an entity is being downloaded to the processing system;

store a network location of the entity in a record, and store one or more of a hash function for the entity, a size of the entity, a series of sections of the entity, and a filename for the entity;

identify when a new file is created in the processing system;

compare information in the record with one or more of a hash function for the new file, a size of the new file, a series of sections of the new file, and a filename for the new file;

if a match is found between the new file and the entity, store at least the network location and the filename for the new file in a second record;

record at least some events performed in the processing system by the new file created in the processing system;

use the at least some recorded events to search the stored network locations for a network location for a file downloaded to the processing system by the new file; and transmit the network location of the new file and the network location of the file downloaded to the processing system by the new file to a remote processing system, wherein the remote processing system downloads the new file and the file downloaded to the processing system directly from the transmitted network locations.

20. The method as claims in claim 1, wherein the remote processing system automatically downloads the entity of interest directly from the network location.

* * * * *